United States Patent [19]

Greinecker et al.

[11] 4,405,744

[45] Sep. 20, 1983

[54] FILLER FOR PAPER, CARD OR BOARD, A PROCESS FOR ITS MANUFACTURE, AND PAPER, CARD OR BOARD CONTAINING THE FILLER

[75] Inventors: Herbert Greinecker, Hallein; Gerhard Stern, Linz, both of Austria

[73] Assignee: Chemie Linz Aktiengesellschaft, Austria

[21] Appl. No.: 265,570

[22] Filed: May 20, 1981

[30] Foreign Application Priority Data

Jun. 2, 1980 [DE] Fed. Rep. of Germany ....... 3020854

[51] Int. Cl.$^3$ ..................... C08L 61/10; C08L 33/26
[52] U.S. Cl. .................................. 524/423; 524/425; 524/445; 524/447; 524/510; 524/555; 523/205; 523/206; 428/407
[58] Field of Search .................... 260/39 R, 42.21; 525/157; 524/445, 447, 555, 593, 425, 423, 510; 106/308 M; 523/205, 206, 208, 209; 428/407

[56] References Cited

U.S. PATENT DOCUMENTS

| | | | |
|---|---|---|---|
| 3,190,850 | 6/1965 | Burke, Jr. ........................... | 525/157 |
| 4,107,126 | 4/1978 | Burke, Jr. et al. ............. | 106/308 M |
| 4,128,528 | 12/1978 | Frisque et al. ...................... | 524/445 |
| 4,132,561 | 1/1979 | Burke, Jr. et al. .................. | 260/424 |
| 4,132,562 | 1/1979 | Burke, Jr. et al. ............. | 106/308 M |
| 4,198,471 | 4/1980 | Nelson ................................. | 525/157 |
| 4,276,212 | 6/1981 | Khanna et al. .................. | 260/39 R |

*Primary Examiner*—Lewis T. Jacobs
*Attorney, Agent, or Firm*—Wenderoth, Lind & Ponack

[57] ABSTRACT

A filler for paper, card or board which has a good retention and consists of an inert core material and a hydrophilic coating, which consists of polyacrylamide having a molecular weight of $10^5$ to $10^7$ or of a mixture of this polyacrylamide with a urea-formaldehyde condensation resin. The filler is prepared by suspending the inert core material in an aqueous solution of a polyacrylamide having a molecular weight of $10^5$ to $10^7$ or in an aqueous solution of such a polyacrylamide and a urea-formaldehyde condensation resin, and drying this suspension by spray drying or in a stream of hot air. This crosslinks the initially water-soluble polymer and forms a coating, adhering to the core, which is insoluble in water but is hydrophilic and swells, and becomes tacky, in the presence of water.

7 Claims, No Drawings

FILLER FOR PAPER, CARD OR BOARD, A PROCESS FOR ITS MANUFACTURE, AND PAPER, CARD OR BOARD CONTAINING THE FILLER

The invention relates to fillers for paper, card or board, a process for the manufacture of the fillers, and papers, cards or boards manufactured with the aid of these fillers.

The use of mineral fillers in the manufacture of paper, board or similar products has long been known. In addition to such advantages as saving of expensive cellulose fibers or other fibers, and better opacity, whiteness, smoothness or printability of the paper formed, these auxiliaries also entail adverse effects, for example a reduction in the strength characteristics of the paper, two-sidedness, caused by uneven distribution in the sheet, or—during manufacture of the paper itself—reduced retention. Because of this reduced retention it is necessary to admix to the fiber pulp a substantially larger amount of filler than is ultimately contained in the finished paper. The excess filler not retained by the paper web runs through the sieve and pollutes the waste water from the machine.

Consequently, it is in practice not possible to use as much filler as would be desirable from an economic point of view, and there has been no lack of attempts to remedy this shortcoming as well as the disadvantages mentioned earlier.

Thus, for example, according to U.S. Pat. No. 4,115,187 the retention of a paper coil can be increased by using mineral particles, especially calcium carbonate particles, which are coated with a coagulated, water-soluble compound, for example starch. The essential object of the invention is to delay the reaction between the acidic aluminum sulfate (papermaker's alum) and the calcium carbonate which is used as the filler.

According to British patent specification No. 1,505,641 it is more advantageous first to coat the inorganic filler particles, especially calcium carbonate, with a small amount of positively charged starch, in order to impart a positive Zeta potential to the particles, and then to coat them with a negatively charged resin, especially a styrenebutadiene copolymer, it being necessary to ensure that the positive Zeta potential of the starch-coated filler particle together with the negative Zeta potential of the anionic resin is approximately zero in the coated particle. The most important disadvantage of this process is that two coating procedures are necessary to produce the filler.

According to German Offenlengungsschrift No. 2,746,968, the filler particles are coated with a material which is as similar as possible to the cellulose, namely with regenerated cellulose, so that the filler in the paper is retained, not by the relatively low interaction forces between filler and cellulose, but by cellulose-cellulose interactions. This in particular improves the retention of the filler during paper manufacture, whilst the finished paper has approximately the properties of a paper which has been produced with non-coated filler, and the saving of cellulose fibers is not very great.

There are additionally a number of other patents or patent applications according to which a good possible method of achieving an individual desired property of the paper has been found, and at the same time other aspects are not taken into account.

Thus, for example, it is possible, according to U.S. Pat. No. 3,912,532, to produce a paper of high opacity and brilliance by suspending clay, kaolin or the like in water, mixing the suspension with a urea-formaldehyde prepolymer and polymerizing the resin on the surface of the filler particles. The cake resulting therefrom evidently tends to stick together and is intended to be comminuted before use, and this naturally results in damage to the coating, which is probably of relatively little importance in respect of the purpose described in that particular patent.

In contrast, a filler has now been found which exhibits substantially increased retention in the pulp compared to an untreated, inorganic filler, noticeably improves the mechanical properties of the finished paper and at the same time does not adversely influence the optical properties.

Accordingly, the present invention relates to a filler for paper, card or board which has a good retention comprising a water insoluble core material and a hydrophilic coating consisting of a polyacrylamide or its mixture with a urea-formaldehyde condensation resin, said polyacrylamide having a molecular weight of $10^5$ to $10^7$ and having been made water-insoluble by crosslinking to an extent, that it is able to swell and to become tacky in the presence of water.

The core of the filler is a finely divided material which is sparingly water-soluble or is even water-insoluble and conforms, in respect of whiteness, light refraction, particle size distribution and chemical properties, to the requirements encountered in the paper industry, and which can be of inorganic or organic nature. Examples of inorganic core materials are various types of kaolin, clays (China clay), gypsum, titanium dioxide and calcium carbonate (chalk); examples of organic core materials are urea-formaldehyde or melamine-formaldehyde resin pigments.

This finely divided filler core is coated with a hydrophilic layer of a polyacrylamide which has a molecular weight of about $10^5$ to $10^7$ and which can also be mixed or crosslinked with water-soluble urea-formaldehyde condensation products. The coating must on the one hand be water-insoluble and adhere to the inert core material, whilst on the other hand it must, on addition of water, become swellable and tacky, that is to say possess hydrophilic character. This is achieved by further crosslinking by a thermal and chemical method. The inert core material is suspended in an aqueous solution of a polyacrylamide, or of a polyacrylamide and a urea-formaldehyde condensation product, and this suspension is dried by spray drying or in a stream of hot air. As a result, the initially water-soluble polymer crosslinks and forms a coating which adheres to the core, is water-insoluble but hydrophilic, and swells and becomes tacky in the presence of water. The crosslinking is effected thermally and chemically, and, especially when using polyacrylamide alone, conventional crosslinking agents such as formaldehyde, glyoxal or water-soluble N-methylol compounds are added. If the polyacrylamide is used as a mixture with water-soluble urea-formaldehyde condensation products, the chemical and thermal crosslinking takes place mainly via the N-methylol groups present in that case. The polyacrylamide can be modified in a conventional manner by anionic groups, such as, for example, by carboxylate groups, which have been formed by partial saponification of the polyacrylamide or by copolymerization of a proportion of methacrylic acid, or by cationic groups which have been introduced by copolymerization of acrylic acid esters or methacrylic acid esters possessing amino groups, such as, for example, the dimethylaminoethanol esters, and which are then quaternized further. Using these anionic or cationic modifications, the specific properties of the filler desired for the particular end use of the paper or paper-like material, such as increase in fiber affinity and improvement in degree of dispersion, can be achieved.

The molar ratio urea:formaldehyde in the water-soluble urea-formaldehyde condensation products can vary within wide limits but the degree of condensation must be so chosen that the resins are still soluble in the requisite amount of water. A molar ratio of urea:formaldehyde of at least 1:1.2 is particularly preferred.

The proportion of urea-formaldehyde condensation products in the polymer coating can vary within wide limits. Though even a polymer coating which only consists of polyacrylamide achieves a substantial improvement in the retention and in the mechanical properties of the paper, an additional distinct improvement can be achieved by addition of urea-formaldehyde condensation products, with or without crosslinking agents. In such cases it can happen that only a proportion of the urea-formaldehyde resin serves to crosslink the polyacrylamide and the remainder is present as a mixture with the crosslinked polyacrylamide.

The improvement reaches an optimum, which in many cases is at a polyacrylamide:urea-formaldehyde ratio of about 1:1, and then decreases again. Where the optimum ratio, which depends on the chain length of the polyacrylamide used, on the nature of the crosslinking, on the nature of the urea-formaldehyde condensation products, on the type of drying, on the degree of drying and on other parameters, is located in an individual case is established by individual experimentation, and in accordance with the end use of the paper.

The amount of the polymer coating can vary within wide limits and is 0.5 to 10% by weight, relative to the finished filler, the range of 1 to 5% by weight being particularly preferred. If a core material which has a particularly large or irregular or crazed surface, such as, for example, diatomaceous earth, is used, which increases the transparency of the finished paper, a higher proportion of resin, about 3 to 10% by weight, is chosen, and the same is true in the case of fillers which, used by themselves, are retained particularly poorly, such as finely divided $TiO_2$ or aluminum oxide hydrate, or fillers which are chemically not inert, such as, for example, chalk, which is attacked by the acidic medium, is partially dissolved and thereby interferes with the desired pH range. In the case of core materials whose retention is not so poor it suffices to use a substantially lower amount of polymer coating, namely approximately from 0.5 to 2% by weight. In general, the amount of the coating depends on the chemical nature of the core material, on the desired properties of the paper or of the board, and at the same time on economic considerations.

To produce the fillers according to the invention, the polymer, where appropriate together with the desired additives, such as crosslinking agents and crosslinking catalysts, for instance acids or acid donors, is dissolved in a liquid medium, preferably in water, the carrier material is finely dispersed in this medium before or after dissolution of the polymer, and the liquid medium is then removed, thereby causing crosslinking.

The removal of the liquid medium is effected by evaporation by means of a suitable drier, for example an air-stream drier, in order to obtain the solid particles having the desired moisture content. A process of manufacture in which the solid/polymer suspension is subjected to spray drying is particularly preferred. Further, it is also possible to work the solid carrier into a paste with only the desired amount of polymer solution and to dry the resulting moist solid in a hot stream of air.

The fillers according to the invention are stable on storage and do not cake together. Only when they are suspended in water do they absorb water, swell and become tacky, thereby developing the retention agent properties.

The fillers according to the invention are employed, in the manufacture of paper, card and board, in the manner usual for fillers, and with the usual additives, such as, for example, sizing agents, flocculating agents, slime-control agents, dispersants to counteract resin problems, and anti-foam agents, which do not adversely affect the effect of the fillers. The fillers according to the invention can also be used in the form of mixtures of several different fillers produced according to the invention, or as a mixture with conventional fillers. After addition of the filler according to the invention to the aqueous medium—in a storage chest or at a later point in the manufacture of the paper—the filler begins to swell and becomes tacky. The time at which the addition is made, and accordingly the residence time, depend on the degree of crosslinking of the polymer coating, on the temperature and salt content of the water, and on the technical capabilities of the particular paper machines. It is particularly advantageous to add the filler according to the invention only shortly before the end, or after beating/refining.

The examples which follow show the manufacture of the filler according to the invention, the increase in retention as a function of the amount of filler added, of the chemical nature of the coating and of the amount of coating agent, and the effect on the mechanical and chemical properties of the paper.

EXAMPLE 1

1,100 g of kaolin having a moisture content of about 10% (adhering water) were suspended in 4.5 l of water and 1,300 g of a 3.85% strength aqueous solution of polyacrylamide (molecular weight about 3,000,000) and were dried by spray-drying. The hot air entry temperature was 200° C. and the exit temperature 90° C. Paper sheets were produced with the filler thus obtained, which had a polymer content of about 4.4% by weight, by the Zellcheming standard method. Fully bleached sulfite cellulose of 33° SR (Schopper-Riegler) was employed for this purpose. The filler retention of the polyacrylamide-coated filler compared to untreated filler is shown in the table below.

| Added amount of filler, expressed as absolutely dry solids in the mesh | % Retention | |
|---|---|---|
| | untreated | treated |
| 10% | 37.4% | 57.6% |
| 20% | 37.2% | 53.0% |
| 30% | 32.7% | 45.5% |
| 40% | 30.5% | 43.9% |

The breaking length (DIN 53,112) was increased substantially compared to paper employing untreated kaolin. At a 5% content of treated filler, the breaking length was increased from 4,300 to 4,500 m, whilst at a filler content of 12% it was increased from 3,200 to 3,800 m. The number of double folds which the paper withstood (DIN 53,412) was increased from 45 to 102. The optical properties, such as whiteness, opacity and cloudiness, were virtually unchanged.

EXAMPLE 2

1,100 g of kaolin (10% moisture content, adhering water) were suspended in 1,090 g of polyacrylamide solution (molecular weight about 4,500,000) after addition of 3.7 l of water; 25 g of urea-formaldehyde resin having a urea:formaldehyde ratio of 1:1.75 were then dissolved in the mixture and thereafter the latter was dried by spray drying. The hot air entry temperature was 210° C. and the exit temperature 95° C.

Using the filler obtained in this manner, which had a polymer content of 4.6% by weight, in which polymer cntent there was about 1 part by weight of polyacrylamide per part by weight of urea-formaldehyde condensate, paper sheets were produced by the Zellcheming standard method. Fully bleached sulfite cellulose (35° SR) was employed; the pH value was adjusted to 5.0 with alum. On addition of 20% of the filler thus produced (the percentage being absolutely dry material relative to cellulose), a retention of 83.7% was achieved, compared to a retention of 56.1% when using untreated kaolin.

EXAMPLE 3

In order to establish the influence of the ratio in which the polyacrylamide and urea-formaldehyde condensate are mixed, Example 2 was repeated, kaolin again being provided with 4.6% of organic coating agent. The coating agent was
- (a) pure polyacrylamide, of molecular weight 4,500,000
- (b) 3 parts by weight of polyacrylamide and 1 part by weight of urea-formaldehyde condensate
- (c) 1 part by weight of polyacrylamide and 3 parts by weight of urea-formaldehyde condensate and
- (d) pure urea-formaldehyde condensate with a urea:-formaldehyde ratio of 1:1.75

On determining the retention according to Example 2, the following values were obtained:
- (a) 73%
- (b) 80.4%
- (c) 74%
- (d) 55.4%.

EXAMPLE 4

In order to illustrate the influence of the amount of coating agent, a comparative experiment was carried out with only 2.5% of pure polyacrylamide, having a molecular weight of 4,500,000. The experiment, which in all other respects corresponded to Examples 2 and 3, gave a retention value of 69.4%.

EXAMPLE 5

Sheets, in each case containing 30% of untreated or treated kaolin, were produced by the standard method on a Rapid-Köthen sheet-forming apparatus, using the filler according to Example 2 and high-milled bleached sulfite cellulose having a freeness of 67° SR (Schopper-Riegler). The measurement of the breaking length (DIN 53,112) gave a value of 2,631 m for the sheets filled with the untreated kaolin and 2,985 m for those filled with the treated kaolin. The retention was found to be 36.8% and 69.7% respectively.

EXAMPLE 6

1,100 g of precipitated calcium carbonate were suspended in 4 l of water and 1,200 g of a 3.85% strength solution of polyacrylamide, having a molecular weight of 800,000, and after adjusting the pH value to 7.2 and adding 4 g of 37% strength formaldehyde the mixture was dried in a stream of hot air at a contact temperature of 110° C., so that a filler containing 4% of polymer was produced. On adding 20% (calculated as absolutely dry material) of the treated filler to a mash of bleached sulfite cellulose having a Schopper-Riegler value of 67, the filler retention was 61%. The retention of the untreated calcium carbonate was only 41%.

In a further experiment, 1.5 g of glyoxal were added, in place of the formaldehyde, in order to partially crosslink the coating material. The retention obtained with this material was 56%.

EXAMPLE 7

700 g of a commercial, organic filler based on urea-formaldehyde (Pergopak $M^R$) were dissolved in 4.5 liters of water and 2,000 g of a 3.85% strength solution of polyacrylamide, of molecular weight 800,000 were homogeneously dispersed in this suspension. After addition of 2.2 g of glyoxal, the suspension was dried in a stream of hot air. Sample sheets were produced with the filler obtained, containing 10% of polymer. To do so, a mixture of 80% of fully bleached, high-milled sulfite cellulose (66° SR) and 20% of sulfate cellulose (54° SR) was employed.

In the sample sheets produced by the standard method, the Pergopak $M^R$ treated in this manner was retained to the extent of 52%. The retention of the untreated filler, on the other hand, was only 38%.

What we claim is:

1. A filler for paper, card or board, which has a good retention comprising a substantially water insoluble, white and inorganic core material and a hydrophilic coating in an amount of 0.5 to 10% by weight, consisting of a polyacrylamide or its mixture with a urea-formaldehyde condensation resin, wherein the molar ratio of urea:formaldehyde is at least 1:1.2, said polyacrylamide having a molecular weight of $10^5$ to $10^7$ and having been made water-insoluble by crosslinking to an extent that it is able to swell and to become tacky in the presence of water.

2. The filler according to claim 1, in which the inorganic white core material is clay, gypsum, titanium dioxide or calcium carbonate.

3. The filler according to claim 2, in which the inorganic white core material is clay.

4. The filler according to claim 1, in which the polyacrylamide is crosslinked by a urea-formaldehyde resin.

5. The filler according to claim 1, in which the polyacrylamide is crosslinked by formaldehyde or glyoxal.

6. The filler according to claim 1, in which the polyacrylamide has a molecular weight of $10^6$ to $10^7$.

7. The filler according to claim 1, in which the sum of admixed urea-formaldehyde resin and crosslinking urea-formaldehyde resin is at most 85% by weight of the hydrophilic coating.

* * * * *